Figure 1:
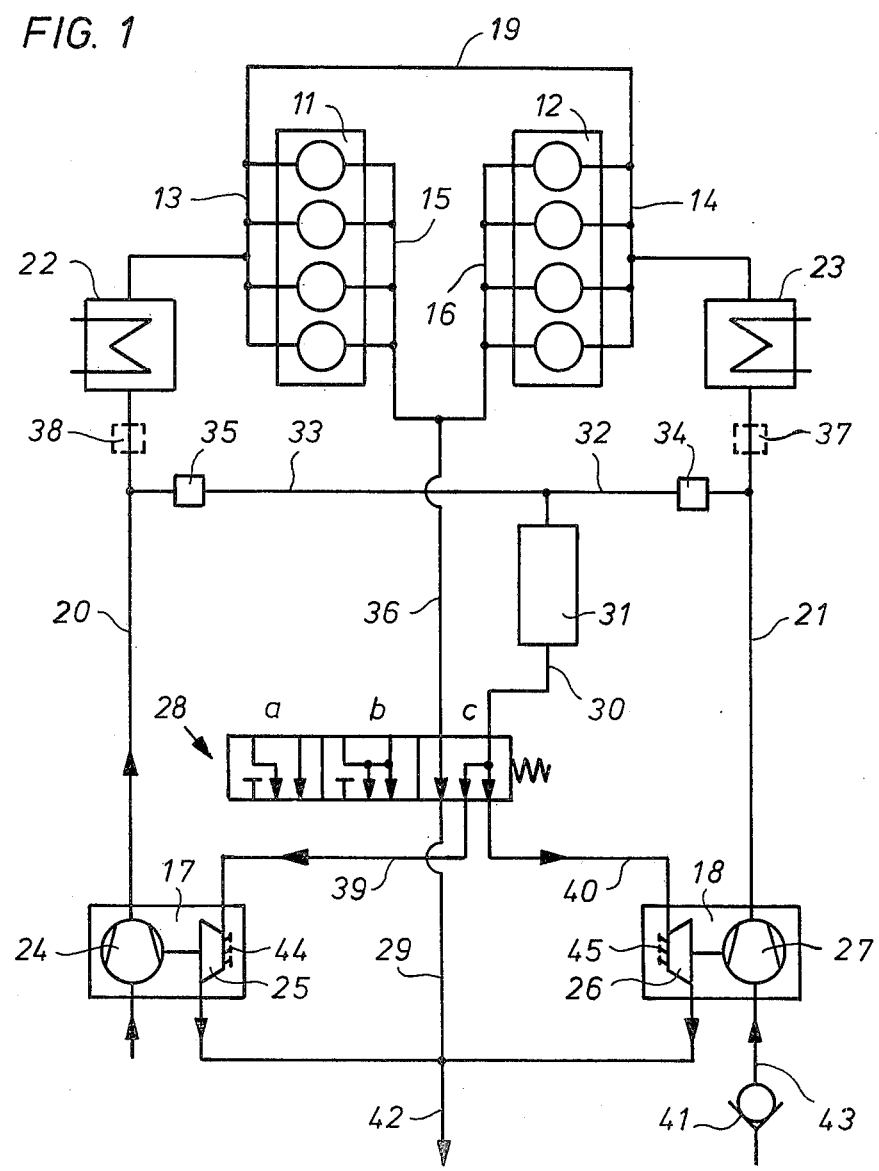

United States Patent [19]

Dinger et al.

[11] 4,422,296
[45] Dec. 27, 1983

[54] INTERNAL COMBUSTION ENGINE WITH SUPERCHARGING BY EXHAUST GAS TURBOCHARGERS AND AN AUXILIARY COMBUSTION CHAMBER

[75] Inventors: Hans Dinger, Friedrichshafen; Helmut Klotz, Tettnang, both of Fed. Rep. of Germany

[73] Assignee: MTU-Motoren-und Turbinen-Union Friedrichshafen GmbH, Friedrichshafen, Fed. Rep. of Germany

[21] Appl. No.: 289,839

[22] Filed: Aug. 4, 1981

[30] Foreign Application Priority Data

Dec. 12, 1980 [DE] Fed. Rep. of Germany ....... 3046876

[51] Int. Cl.³ ............................................. F02B 37/00
[52] U.S. Cl. ......................................... 60/606; 60/612
[58] Field of Search ................... 60/606, 612

[56] References Cited

U.S. PATENT DOCUMENTS

| | | | |
|---|---|---|---|
| 2,898,731 | 8/1959 | Barr | 60/606 |
| 4,299,090 | 11/1981 | Deutschmann | 60/612 |

FOREIGN PATENT DOCUMENTS

| | | | |
|---|---|---|---|
| 182786 | 3/1923 | United Kingdom | 60/612 |
| 2034815 | 6/1980 | United Kingdom | 60/612 |

*Primary Examiner*—Michael Koczo
*Attorney, Agent, or Firm*—Craig & Burns

[57] ABSTRACT

An internal combustion engine which is supercharged by exhaust gas turbochargers and which includes an auxiliary combustion chamber. Exhaust gases from the auxiliary combustion chamber are temporarily fed to turbines of the exhaust gas turbocharger for improving acceleration characteristics of the internal combustion engine. The combustion air for the auxiliary combustion chamber is derived from the stream of supercharging air produced by the turbochargers. At least two exhaust turbochargers are provided which operate in parallel. In case of acceleration of the engine, the exhaust gases from the internal combustion engine circumvent the turbines of the exhaust gas turbochargers, and then the exhaust gases of the auxiliary combustion chamber alone effect the drive for all exhaust gas turbochargers. In addition to the at least two exhaust gas turbochargers for the normal operation of the engine, at least one further exhaust gas turbocharger is provided which is likewise fed with exhaust gases from the auxiliary combustion chamber during acceleration of the internal combustion engine.

15 Claims, 2 Drawing Figures

INTERNAL COMBUSTION ENGINE WITH SUPERCHARGING BY EXHAUST GAS TURBOCHARGERS AND AN AUXILIARY COMBUSTION CHAMBER

The present invention relates to an internal combustion engine and, more particularly, to a supercharged internal combustion engine which includes exhaust gas turbochargers and an auxiliary combustion chamber, whose exhaust gases are temporarily fed to a turbine of the exhaust gas turbocharger for improving the acceleration characteristic of the internal combustion engine, and in which the combustion air of the auxiliary combustion chamber is taken from the flow of supercharging air produced by the exhaust gas turbocharger.

For the purpose of improving acceleration characteristics of internal combustion engines, two different systems have been proposed. The operating principle of these systems resides in raising the energy content of the exhaust gas stream, produced by the internal combustion engine during idling or low partial load, prior to entering the turbine of the exhaust gas turbocharger. By means of the energy-enriched exhaust gas, a rapid increase in the number of revolutions of the exhaust gas turbocharger and/or a rapid pressure build-up in the supercharging air system of the internal combustion engine is attained.

In one of the above-noted proposed systems, the exhaust gas of the internal combustion engine flows through an auxiliary combustion chamber. In the auxiliary combustion chamber, the temperature and quantity of the exhaust gases are increased by feeding fuel combusting with the use of residual oxygen contained in the exhaust gas. A disadvantage of this proposed system resides in the fact that the combustion characteristic of the auxiliary combustion chamber is unstable due to the pulsating exhaust gas stream from the internal combustion engine and, consequently, may even lead to an extinction of the combustion process in the auxiliary combustion chamber.

In the other above-noted proposed system, the auxiliary combustion chamber is not fed with exhaust gases but instead is fed with fuel and with combustion air branched off from the supercharging air stream for the internal combustion engine. The hot gas produced in the auxiliary combustion chamber is then admixed to the exhaust gas stream from the internal combustion engine prior to entrance into the turbine of the exhaust gas turbocharger. While this system makes it possible to realize a stable operation of the auxiliary combustion chamber and to appreciably improve the acceleration characteristic of the internal combustion engine, a grave disadvantage of this system resides in the fact that, with an optimum adaptation of the system, that is, internal combustion engine plus axuiliary combustion chamber, the normal operation of the internal combustion engine without support by the auxiliary combustion chamber is very unsatisfactory.

The aim underlying the present invention essentially resides in providing an operational reliable system of a supercharger internal combustion engine with an auxiliary combustion chamber, which significantly improves the acceleration characteristics of the internal combustion engine.

The underlying problems are solved in accordance with the present invention in that at least two exhaust gas turbochargers are provided operating in parallel, in that in case of an acceleration of the engine, the exhaust gases of the internal combustion engine by-pass the turbines of the exhaust gas turbochargers and in that the exhaust gases of the auxiliary combustion chamber alone effect the drive of all exhaust gas turbochargers.

Advantageously, in accordance with further features of the present invention, the turbines of the exhaust gas turbochargers are together designed for the exhaust gas mass stream of the auxiliary combustion chamber and the turbines of the exhaust gas turbochargers are provided with a conventional adjustable guide apparatus or difuser.

In accordance with still further features of the present invention, in addition to the exhaust gas turbocharger or turbochargers employed for normal operation of the internal combustion engine, at least one further exhaust gas turbocharger is provided, to which with exhaust gases from the auxiliary combustion chamber are also fed during acceleration of the internal combustion engine.

In accordance with the present invention, the subdivision of the supercharging air stream between the auxiliary combustion chamber and the internal combustion engine is effected by at least one adjustable throttle element.

The advantages achieved with the present invention reside in particular in that the exhaust work to be expended by the internal combustion engine during normal operation for expelling the exhaust gases from the cylinders against the flow resistance of the exhaust turbine blading is now additionally available for the internal combustion engine to be used during acceleration of the engine. Moreover, as compared with a supercharged internal combustion engine without auxiliary device, the present invention provides for a marked reduction in the time span required for accelerating the internal combustion engine from idling to full load operation.

Additionally, it becomes possible by virtue of the present invention to operate the auxiliary combustion chamber without influence by the exhaust gas pulsation of the internal combustion engine.

Moreover, by the elimination of the trouble spot or trouble place which the convergence of the exhaust gases from the internal combustion engine and from the auxiliary combustion chamber represented heretofore for the exhaust gas flow, the line for the exhaust gases of the internal combustion engine can be constructed to allow for an optimum flow guidance.

Accordingly, it is an object of the present invention to provide a supercharged internal combustion engine which avoids, by simple means, the aforementioned shortcomings and disadvantages encountered in the prior art.

Another object of the present invention resides in providing a supercharged internal combustion engine which improves the acceleration characteristics of the engine.

Yet another object of the present invention resides in providing a supercharged internal combustion engine which functions reliably under all operating conditions of the engine.

A still further object of the present invention resides in providing an internal combustion engine which is simple in construction and therefore relatively inexpensive to manufacture.

Figure 2:
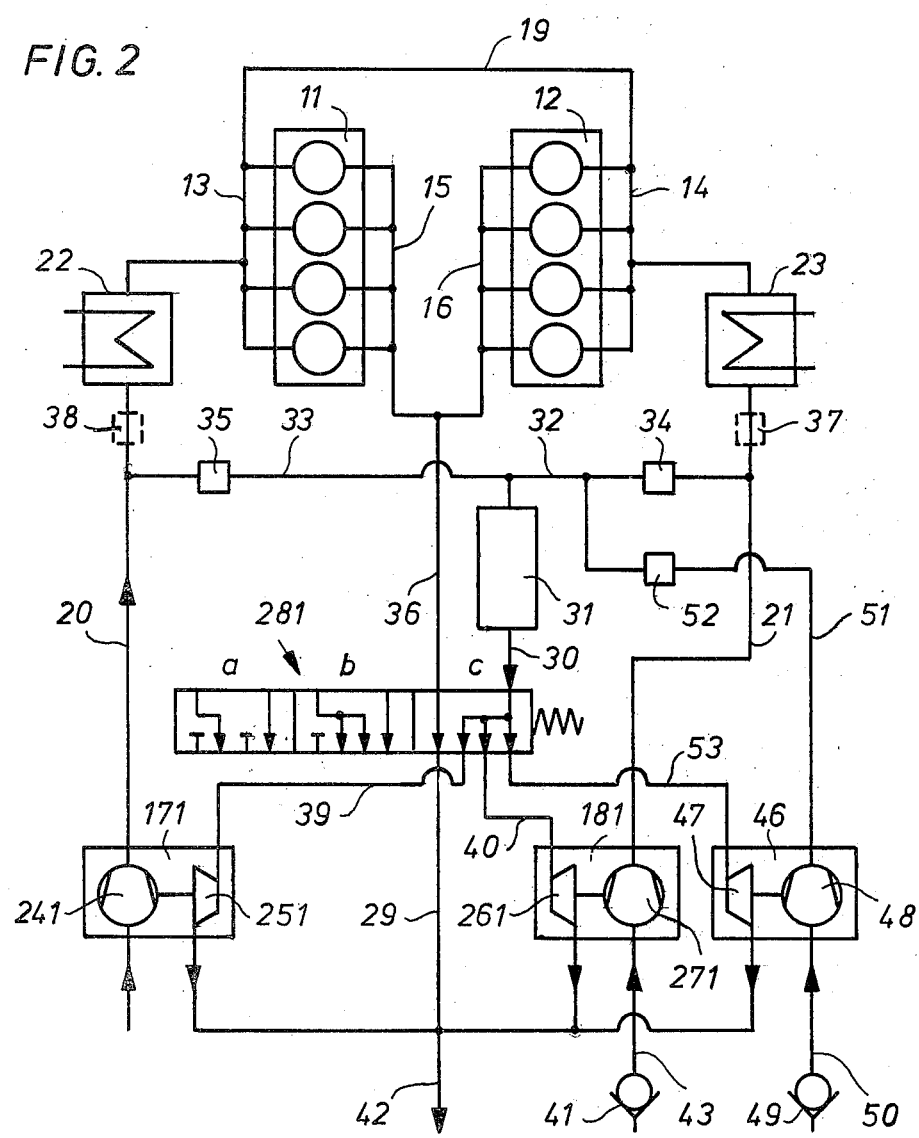

These and other objects, features, and advantages of the present invention will become more apparent from the following description when taken in connection with the accompanying drawing which shows, for the purposes of illustration only, two embodiments in accordance with the present invention, and wherein:

FIG. 1 is a schematic view of an internal combustion engine constructed in accordance with the present invention provide with two exhaust gas turbochargers; and FIG. 2 is a schematic view of an internal combustion engine constructed in accordance with the present invention provided with three exhaust gas turbochargers.

Referring now to the drawings wherein like reference numerals are used in both views to designate like parts and, more particularly, to FIG. 1, according to this figure, an internal combustion engine is provided with two rows of cylinders 11, 12, which include each one supercharging air line 13, 14 and one exhaust gas line 15, 16 respectively. The engine is supplied with precompressed supercharging air through the supercharging air conduits 13, 14 by the exhaust gas turbochargers 17, 18. An overflow line 19 is provided for connecting the supercharging air conduits 13, 14 with each other. Air coolers 22, 23 are disposed in the supercharging air supply or feed lines 20, 21 upstream of the air conduits 13, 14. The air supply lines 20, 21 extend from compressors 24, 27 of the exhaust gas turbocharger 17, 18. The exhaust gases are supplied from the engine through the exhaust gas lines 15, 16 to the turbines 25, 26 of the exhaust gas turbochargers 17, 18, respectively.

A switchover or changeover unit generally designated by reference numeral 28 is interposed between the exhaust gas lines 15, 16 and the respective exhaust gas turbochargers 17, 18. The switchover or changeover unit 28 is displaceable between switching positions "a", "b", "c". An exhaust line 30 of an auxiliary combustion chamber 31 is connected to the switchover unit 28. Combustion air from the supercharging air supply lines 20, 21 is fed by way of lines 32, 33 to the auxiliary combustion chamber 31.

Control devices 34, 35 control the flow of combustion air to the auxiliary combustion chamber 31. The control devices 34, 35 are adjustable so as to provide a zero feeding of the flow of combustion air to the auxiliary combustion chamber 31. The control devices 34, 35 are respectively arranged at least in lines 32, 33. The control devices 34, 35 may be additionally supported by at least one further control device 37, 38 arranged in the supercharging air supply line 20, 21, respectively. During normal operation when the internal combustion engine operates at idling or low load, the switchover unit is in the position "a". The closed control devices 34, 35 block the air supply to the auxiliary combustion chamber 31 and the exhaust gas of the internal combustion engine is conducted through line 39 only to the exhaust gas turbocharger 17 which alone assumes the supply of supercharging air to the internal combustion engine by the compressor 24, supercharging air supply line 20 and overflow line 19. Since the exhaust gas turbocharger 18 is not being driven, that is, the compressor 27 is inoperable, the check valve 41 disposed on the intake side of the compressor 27 is closed under the effect of the supercharging air pressure built up in the supercharging air duct system of the internal combustion engine by the compressor 24.

For an impending case of acceleration, i.e., if it can be foreseen that the internal combustion engine must be ready for a rapid increase in the rotational speed from idling or at a partial load condition, the control device 34 or 35 is opened and thus the air supply to the auxiliary combustion chamber 31 is opened. In the position "a" of the switchover unit 28, the auxiliary combustion chamber 31 is ignited and is initially operated at a low output. The exhaust gas from the auxiliary combustion chamber 31, flowing to the turbine 26 through the conduits 39, 40, drives the exhaust gas turbocharger 18. Due to an initially only small mass flow of exhaust gases, only a relatively low rotational speed is attained by the exhaust gas turbocharger 18. An air supply from the compressor 27, against the charging air pressure produced in the supercharging air system by the exhaust gas turbocharger 17, will not take place so that the check valve 41 remains in a closed position.

For an actual acceleration operation of the internal combustion engine from an idling or partial load condition, the switchover unit is shifted to the position "c". The exhaust gases from the internal combustion engine then pass through the line 29 directly into the exhaust pipe 42 thereby bypassing the exhaust gas turbines 25, 26. The exhaust line 30 of the auxiliary combustion chamber 31, in the position "c" of the switchover unit 28, is connected by means of the branching arrangement in the switchover unit 28 to lines 39 and 40 and hence to the turbines 25, 26 of the exhaust gas turbochargers 17, 18. At the same time, both control devices 34 and 35 are fully opened and the auxiliary combustion chamber 31 is built-up to full load operation. The auxiliary combustion chamber 31 is designed so that its exhaust gas production is adequate to satisfy the air consumption of the internal combustion engine for the acceleration operation as well as the air consumption of the auxiliary combustion chamber 31 during full load operation by means of the two exhaust gas turbochargers 17, 18.

Due to the special conduction of the exhaust gas through lines 36, 29 to the exhaust pipe 42, the internal combustion engine is relieved from its exhaust gas exhaust work against a counterpressure which would otherwise exist due to the turbine blading of the exhaust gas turbochargers 17, 18. The torque to be expended by the engine for the expulsion work of the exhaust gases is thus assistingly available for the acceleration operation. Additionally, with a corresponding matching of the auxiliary combustion chamber 31 with the exhaust gas turbochargers 17 and 18, a higher supercharging pressure can be realized in the case of an acceleration than during normal operation. In any event, all these measures bring about an exceedingly rapid acceleration of the internal combustion engine.

If the rotational speed of the internal combustion engine and/or of the exhaust gas turbochargers 17, 18 has increased during acceleration up to a value lying in the upper partial load range, the temperature of the exhaust gas from the auxiliary combustion chamber 31 reaches a value which is no longer tolerable for the turbines 25, 26 of the exhaust gas turbochargers 17, 18. This rise in temperature results from the fact that the air consumption of the internal combustion engine increases with an increasing number of revolutions and thus the mass flow of combustion air remaining for the auxiliary combustion chamber 31 is reduced, although the amount of fuel combusted per unit time in the auxiliary combustion chamber 31 remains approximately the same. Consequently, in this operating phase, the moment will occur when, with a further increasing air consumption of the internal combustion engine, the auxiliary combustion chamber 31 can finally no longer be operated at full load due to the lack of sufficient supply of combustion air.

Consequently, a reduction of the output of the auxiliary combustion chamber 31 occurs, namely, down to a readiness state or condition. At the same time, the switch over unit 28 is shifted into the position "b" and the exhaust gas mass flow produced at this partial high load of the internal combustion engine which is already very large, is now fed in place of the exhaust gases from the auxiliary combustion chamber 31 to the exhaust gas turbocharger 17, 18 through the lines 39, 40. Since the exhaust gas mass flow from the auxiliary combustion chamber 31 at full load is significantly larger than the exhaust gas mass flow from the internal combustion engine at full load, the turbines 25, 26 are respectively equipped with at least one adjustable diffuser or guide unit 44, 45 for adaptation to the smaller exhaust gas mass flow from the internal combustion engine.

Only if the auxiliary combustion chamber 31 is in a readiness output condition, with an exhaust gas production that is very low as compared to full load operation, there takes place, in the position "b" of the switchover unit 28, a feeding of the auxiliary combustion chamber exhaust gases from the exhaust line 30 to the exhaust gases from the internal combustion engine. However, even with such a feeding, the normal operation of the internal combustion engine is not impaired thereby.

A more economical solution results in that the two exhaust gas turbochargers 17 and 18 are designed only for the exhaust gas mass flow at full load operation of the internal combustion engine. The expensive guide devices 44, 45 can then be dispensed with. Since the exhaust gas absorption capacity of the exhaust gas turbocharger 17, 18 is smaller compared to the illustrated example of FIG. 1, a smaller structural size can also be selected for the auxiliary combustion chamber 31.

However, the last-mentioned solution restricts the effectiveness of the acceleration process since the lack of combustion air, limiting the use of the auxiliary combustion chamber 31, already occurs at a relatively low partial load speed of the internal combustion engine due to the smaller exhaust gas turbochargers and the smaller auxiliary combustion chamber 31. Thus, the internal combustion engine must accelerate over a somewhat larger range of rotational speed than in the above-described embodiment, without assist by the auxiliary combustion chamber 31.

It is also possible in accordance with the present invention to modify the construction of FIG. 1 by designing one of the two exhaust gas turbochargers, for example, the exhaust gas turbocharger 17 for the entire operating range of the internal combustion engine from idling to full load operation, whereby the turbine 25 may also be provided with an adjustable diffuser or guide device. With such an arrangement, the exhaust gas turbocharger 18 is never fed with exhaust gases from the internal combustion engine during normal operation of the engine. Thus, the check valve 41 in the intake of the compressor 27 is constantly closed during the normal operation period. Consequently, the switchover unit 28 requires only two positions, that is, the position "a" and the position "c". The position "a" is required for normal operation and ignition of the combustion chamber 31 whereas the position "c" is set for acceleration of the engine. The exhaust gas turbocharger 18 is then also supplied with exhaust gases from the auxiliary combustion chamber 31.

FIG. 2 illustrates an embodiment which results from a combination of the two last mentioned modifications. According to this figure, for the normal operation of the internal combustion engine without the assist of the auxiliary combustion chamber 31, exhaust gas turbochargers 171 and 181 are so dimensioned that the supercharging air is supplied to the internal combustion engine in dependence on the partial load range by one or by both exhaust gas turbochargers 171, 181 together under optimum operating conditions. The switchover unit 281 is then either in the position "a" for the lower partial load range corresponding to a "single turbocharger operation" or in the position "b" for the upper partial load range up to full load range of operation of the internal combustion engine corresponding to a "two turbocharger operation".

During an acceleration of the internal combustion engine from idling or at small partial load, the course of operation is exactly as described hereinabove in connection with FIG. 1. The combined exhaust gas absorption capacity respectively the combined air supply of the two exhaust gas turbochargers 171 and 181 is designed, due to optimization, solely for the normal operation of the internal combustion engine and therefore too small for the exhaust gas or air mass flows which occur during acceleration with auxiliary combustion chamber assist.

In order to adapt the construction of FIG. 2 to the requirements during an acceleration course, a further exhaust gas turbocharger 46 is provided, consisting of an exhaust gas turbine 47 and of a compressor 48. Exhaust gases are fed to the compressor 48 through line 53 only if the auxiliary combustion chamber 31 is ignited. The air supply by the compressor 48 reaches the line 32 leading to the auxiliary combustion chamber 31 by way of the line 51, in which is arranged the control device 52 adjustable to provide for zero feed of air through the line 51 into the conduit 32. A check valve 49 is provided in the intake line 50 of the compressor 48 in the same manner as the check valve 41 in the intake line 43 of the compressor 271 of the exhaust gas turbocharger 181. With the control devices 34 or 35 and 52, respectively, being open, and with the auxiliary combustion chamber 31 being ignited but only at low power so that the exhaust gas turbocharger 46 is not yet capable to supply air against the prevailing supercharging air pressure, the check valve 49 prevents a pressure drop in the supercharging air system of the internal combustion engine.

With the exhaust gas turbocharger 46, the mass throughflow which can be processed altogether by means of the three exhaust gas turbochargers 171, 181, 46, corresponds approximately to the mass throughflow which may be processed in the embodiment of FIG. 1. Since no expensive adjustable diffusers or guide apparatus are required for the exhaust gas turbochargers 171, and 181 and the exhaust gas turbocharger 46 may be of the same size or smaller than the exhaust gas turbochargers 171 and 181, an especially economical solution is thus attained as viewed from the number of structural parts required.

As can readily be appreciated, the combination of the exhaust gas lines 15, 16 in the conduit 36 upstream of the switchover unit 28 or 281 is not the only possible arrangement. For example, the exhaust gas lines 15, 16 may also be extended separately up to the switchover unit 28 or 281 may be combined in the positions "a" and "c" only on the inside of the switchover unit 28 or 281 to feed in unison the line 39 or line 29. As a result thereof, the combining of the line paths for the exhaust gases from the internal combustion engine is eliminated in the position "b" if each cylinder row 11, 12 operates in conjunction with one of the exhaust gas turbochargers 17, 18 or 171, 181.

For the sake of clarity, the switchover unit 28 or 281 has been illustrated as a closed or integrated unit; however, it is likewise possible to utilize separate switchover devices for the lines controlled by the switchover unit 28 or 281.

While we have shown and described several embodiments in accordance with the present invention, it is understood that the same is not limited thereto but is suscepticle of numerous changes and modifications as known to one having ordinary skill in the art and we therefore do not wish to be limited to the details shown and described herein, but intend to cover all such modifications as are encompassed by the scope of the appended claims.

We claim:

1. An internal combustion engine with supercharging by exhaust gas turbocharger means having turbine and compressor means and with an auxiliary combustion chamber means whose exhaust gases are temporarily fed to the turbine means of the exhaust gas turbocharger means for improving the acceleration characteristics of the engine, characterized in that at least two exhaust gas turbocharger means operating in parallel are provided, each including a turbine means and a compressor means, and means during acceleration of the engine for enabling the exhaust gases of the internal combustion engine to bypass the turbine means of the at least two exhaust gas turbocharger means and for feeding the exhaust gases from the auxiliary combustion chamber means to the turbine means of the at least two exhaust gas turbocharger means so that the exhaust gases of the auxiliary combustion chamber means alone effect drive of the at least two turbocharger means during such acceleration.

2. An internal combustion engine according to claim 1, characterized in that means are provided for supplying combustion air to the auxiliary combustion chamber means from a stream of supercharged air produced by the at least two exhaust gas turbocharger means.

3. An internal combustion engine according to one of claims 1 or 2, characterized in that the turbine means of the at least two turbocharger means together are designed and constructed to provide a sufficient exhaust gas mass flow for the auxiliary combustion chamber means, and in that each of the turbine means is provided with at least one adjustable diffuser means.

4. An internal combustion engine according to one of claims 1 or 2, characterized in that at least one additional turbocharger means is provided for normal operation of the engine, and in that means are provided for supplying compressed air from the additional turbocharger means to the auxiliary combustion chamber means during acceleration of the engine.

5. An internal combustion engine according to one of claims 1 or 2, characterized in that means are provided for subdividing the supercharging air between the auxiliary combustion chamber means and the engine.

6. An internal combustion engine according to claim 5, characterized in that the subdividing means includes at least one adjustable throttle means.

7. An internal combustion engine according to one of claims 1 or 2, characterized in that the means for enabling the exhaust gases of the engine to bypass the turbine means of the at least two turbocharger means and for feeding the exhaust gases from the auxiliary combustion chamber means to the turbocharger means includes at least one shifting valve means.

8. An internal combustion engine according to claim 2, wherein the auxiliary combustion chamber means is so matched to the turbine means of the at least two turbocharger means that a higher charging pressure can be realized with said last mentioned turbine means during acceleration than during normal operation of the engine.

9. An internal combustion engine according to claim 8, wherein the auxiliary combustion chamber means is so constructed that the exhaust gas production is adequate to satisfy the air consumption of the engine during acceleration as also the air consumption of the auxiliary combustion chamber means at full load operation.

10. An internal combustion chamber according to claim 9, wherein the turbine means of said at least two exhaust gas turbocharger means are designed together for the exhaut gas mass flow of the auxiliary combustion chamber means.

11. An internal combustion engine according to claim 10, wherein the turbine means of said at least two turbocharger means include each adjustable guide means for adapting to the prevailing exhaust gas mass flow from the engine.

12. An internal combustion engine according to claim 2, wherein the auxiliary combustion chamber means is so constructed that its exhaust gas production is adequate to satisfy the air consumption of the engine during acceleration as also the air consumption of the auxiliary combustion chamber means at full load operation.

13. An internal combustion chamber according to claim 2, wherein the turbine means of said at least two exhaust gas turbocharger means are designed together for the exhaust gas mass flow of the auxiliary combustion chamber means.

14. An internal combustion engine according to claim 13, wherein the turbine means of said at least two turbocharger means include each adjustable guide means for adapting to the prevailing exhaust gas mass flow from the engine.

15. An internal combustion engine according to claim 2, wherein at least one additional turbocharger means is provided for normal operation of the engine, to which exhaust gases from the auxiliary combustion chamber means are also fed during acceleration of the engine.

* * * * *